(12) United States Patent
Kuivas et al.

(10) Patent No.: US 6,900,981 B2
(45) Date of Patent: May 31, 2005

(54) MOBILE TERMINAL WITH SYNCHRONIZING HINGE

(75) Inventors: Juha Kuivas, Oulu (FI); Pekka Paakkonen, Jaali (FI); Ilpo Kauhaniemi, Vantaa (FI)

(73) Assignee: Nokia Corporation, Espoo (FI)

( * ) Notice: Subject to any disclaimer, the term of this patent is extended or adjusted under 35 U.S.C. 154(b) by 64 days.

(21) Appl. No.: 10/421,278

(22) Filed: Apr. 23, 2003

(65) Prior Publication Data

US 2004/0212956 A1 Oct. 28, 2004

(51) Int. Cl.⁷ .................................................. G06F 1/16
(52) U.S. Cl. ...................... 361/683; 361/759; 345/905; 248/920
(58) Field of Search ................................ 361/679–687, 361/724–727, 740, 759; 345/169, 905; 439/928; 248/917–923; 364/708.1

(56) References Cited

U.S. PATENT DOCUMENTS

| | | | | |
|---|---|---|---|---|
| 6,344,977 B1 | * | 2/2002 | Takagi | 361/814 |
| 6,445,574 B1 | * | 9/2002 | Saw et al. | 361/681 |
| 6,456,487 B1 | * | 9/2002 | Hetterick | 361/683 |
| 6,519,141 B2 | * | 2/2003 | Tseng et al. | 361/683 |
| 2002/0154475 A1 | | 10/2002 | Lammintaus et al. | 361/683 |

* cited by examiner

*Primary Examiner*—Hung Van Duong

(57) ABSTRACT

An electronic device including a first section having a keypad; a second section having a display; and a connection movably connecting the second section with the first section. The connection includes a first axis of rotation with the first section, an offset second axis of rotation with the second section, and synchronizing members which rotate the first section relative to the connection in unison with rotation of the second section relative to the connection.

24 Claims, 5 Drawing Sheets

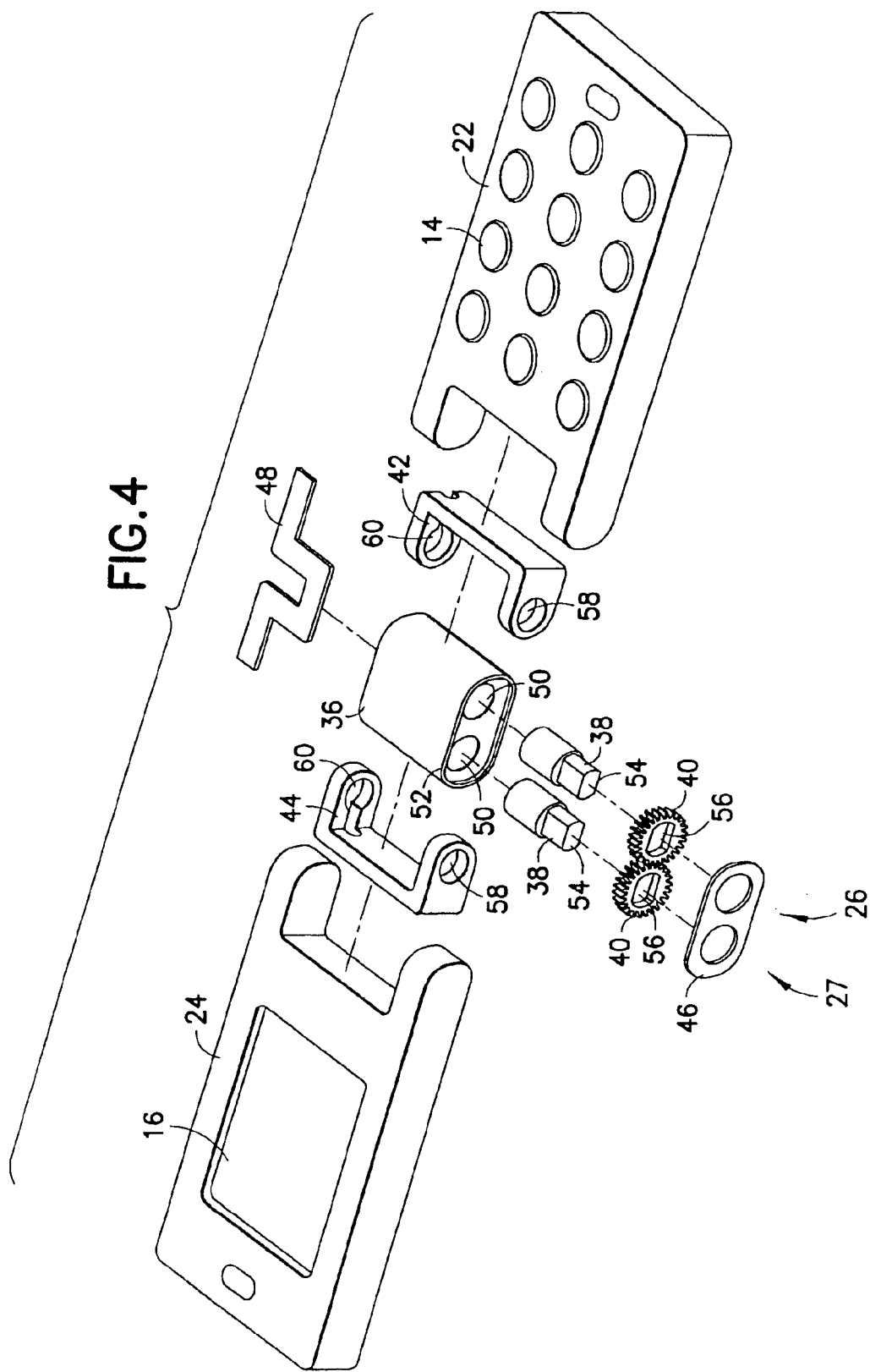

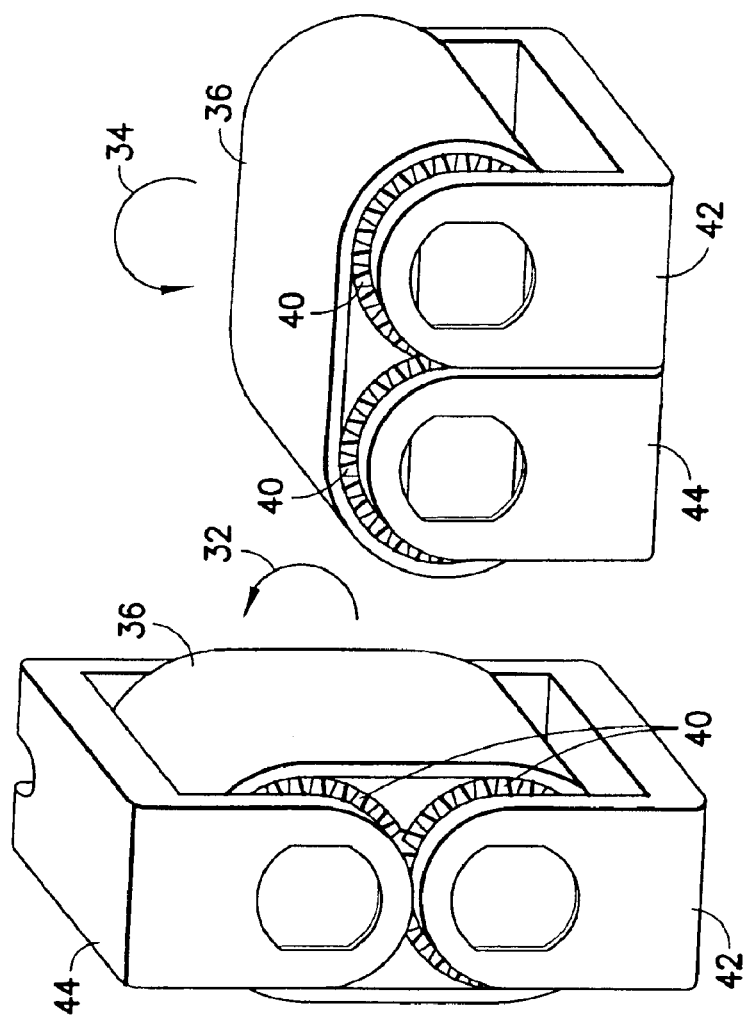
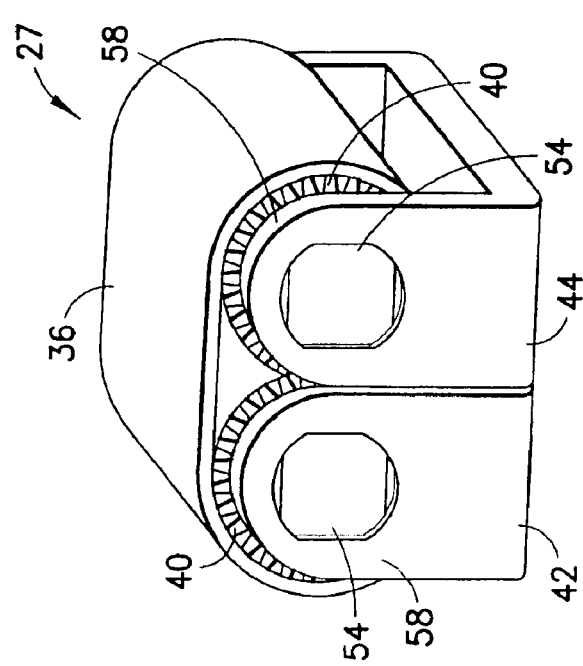

MOBILE TERMINAL WITH SYNCHRONIZING HINGE

BACKGROUND OF THE INVENTION

1. Field of the Invention

The present invention relates to mobile electronic devices and, more particularly, to a folding electronic device.

2. Brief Description of Prior Developments

US Patent Publication No. US 2002/0154475 A1 discloses a folding electronic device. The device has a first part with a keyboard and a second part with a display. The second part is connected to the first part by a two-joint mechanical hinge. The second part can be moved between a first position against a first side of the first part and a second position against an opposite second side of the first part.

Fold mobile phones, also known as a flip phone or a clamshell phone, are becoming more and more popular in today's mobile telephone market, especially in Asia. In normal fold mobile phones, the phones have a lid with a display which pivots about 160–180 degrees relative to the portion of the telephone having the keypad. The fold phone has two positions of the lid; either a closed position or an open position.

There is a desire for a new type of reconfigurable mobile telephone which can be configured similar to a conventional flip phone, and which also can be reconfigured with the lid pivoted more than 180 degrees, such as 360 degrees. However, for such a multi-open position fold mobile telephone, there is a desire to provide a robust and compact design which can provide a smooth opening and closing motion for the user. This type of motion will prevent the user from erroneously perceiving the mobile telephone as having a flimsy construction (which might be perceived from a flip phone which opens and closes too easily or with a hinge that does not moved in a consistent repetitive fashion).

SUMMARY OF THE INVENTION

In accordance with one aspect of the present invention, an electronic device is provided including a first section having a keypad; a second section having a display; and a connection movably connecting the second section with the first section. The connection includes a first axis of rotation with the first section, an offset second axis of rotation with the second section, and synchronizing members which rotate the first section relative to the connection in unison with rotation of the second section relative to the connection.

In accordance with another aspect of the present invention, a mobile communications device is provided comprising a housing; a transceiver in the housing; a keypad connected to the housing; and a display connected to the housing. The housing comprises a first section movably connected to a second section of the housing by a multi-axis hinge. A first axis of rotation of the hinge is provided at the first section of the housing. A second offset axis of rotation of the hinge is provided at the second section of the housing. The hinge comprises means for synchronizing rotation of the first and second sections relative to the hinge through a path of about 360 degrees.

In accordance with another aspect of the present invention, a mobile communications device is provided comprising a housing having a first section, a second section, and a synchronized rotation multi-axis hinge connection connecting the first section with the second section; a transceiver located in the housing; a key pad connected to the housing; a display connected to the housing; and a flex conductor extending across the hinge connection and coupling electronic circuitry in the first section of the housing with electronic circuitry in the second section of the housing. The synchronized rotation multi-axis hinge connection comprises a hinge frame; two hinge pins rotatably mounted in the hinge frame; synchronizing gears connecting the hinge pins to each other; a first frame member fixedly connecting a first one of the hinge pins to the first section of the housing; and a second frame member fixedly connecting a second one of the hinge pins to the second section of the housing. The second section of the housing is adapted to rotate about 360 degrees relative to the first section of the housing.

BRIEF DESCRIPTION OF THE DRAWINGS

The foregoing aspects and other features of the present invention are explained in the following description, taken in connection with the accompanying drawings, wherein:

FIG. 4 is an exploded perspective view of the electronic device shown in FIG. 1;

FIG. 5 is a perspective view of the hinge used in the electronic device shown in FIG. 1 with the hinge shown at a first closed position corresponding to the position shown in FIG. 1;

FIG. 6 is a perspective view of the hinge shown in FIG. 5 moved to a second intermediate position corresponding to the position shown in FIG. 2;

FIG. 7 is a perspective view of the hinge shown in FIG. 5 moved to a third position corresponding to the position shown in FIG. 3;

DETAILED DESCRIPTION OF THE PREFERRED EMBODIMENTS

Figure 1:
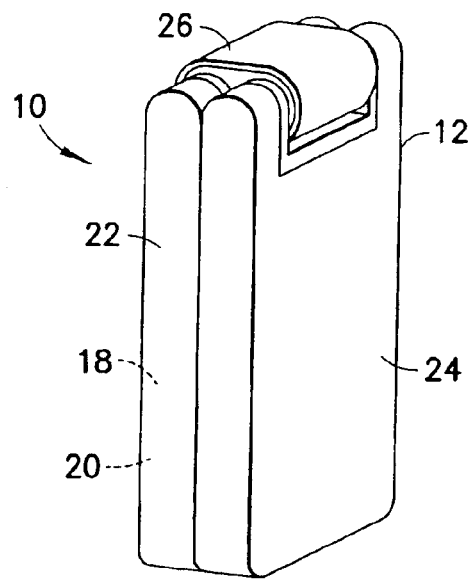
FIG. 1 is a perspective view of an electronic device in a first closed position incorporating features of the present invention.

Referring to FIG. 1, there is shown a perspective view of an electronic device 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

In the embodiment shown, the electronic device 10 generally comprises a mobile communicator, such as a mobile telephone. In alternate embodiments, the electronic device could comprise any suitable type of mobile communicator, such as a device which comprises a pager function or a text transmission function. The electronic device 10 could comprise any suitable type of features including, for example, a digital camera feature.

Figure 2:
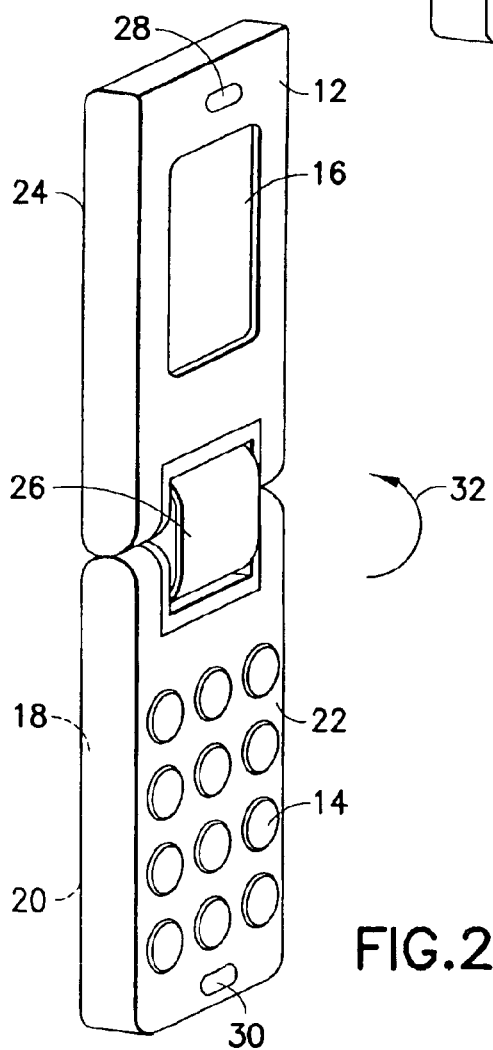
FIG. 2 is a perspective view of the electronic device shown in FIG. 1 with housing components moved to an intermediate flipped open position.

Referring also to FIG. 2, the electronic device 10, in the embodiment shown, generally comprises a housing 12, a keypad 14, a display 16, a transceiver 18, a battery 20 and other components conventional to a mobile telephone, such as a microprocessor and an antenna. The housing 12 generally comprises a first section 22, a second section 24, and a connection 26 which movably connects the second section 24 to the first section 22. In the embodiment shown, the keypad 14 is connected to the first section 22 of the housing. The display 16 is connected to the second section 24 of the housing. In alternate embodiments, the various electronic components of the telephone 10 could be located in any one of the housing sections.

Figure 3:
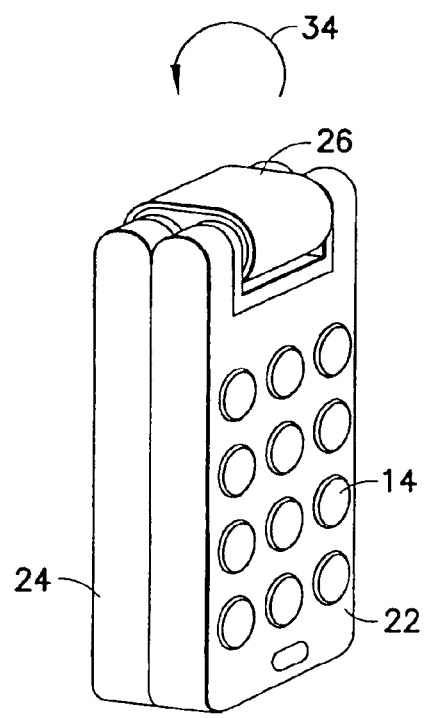
FIG. 3 is a perspective view of the electronic device shown in FIG. 1 with housing components moved to a 360 degree fully flipped open and folded position.

Referring particularly to FIGS. 1–3, the housing 12 is movable into at least three different configurations. FIG. 1 shows the housing 12 in a closed, folded first configuration. In this closed, folded first configuration the first and second sections 22, 24 are located adjacent each other with the display 16 and keypad 14 facing each other. This provides a compact folded configuration wherein the keypad 14 and display 16 are not readily accessible to the user. In an alternate embodiment, the first section 22 could comprise the display 16.

FIG. 2 shows the housing 12 in the first open position. More specifically, the connection 26 allows the second section 24 of the housing to be flipped open about 180 degrees relative to the first section 22 of the housing as indicated by arrow 32. In the embodiment shown, the second section 24 is substantially aligned with the first section 22 and the connection 26. However, in alternate embodiments, the first open position could comprise the second section 24 being located at an angle of less than 180 degrees, such as about 160 degrees for example. This first open position allows the user to locate a speaker or sound transducer 28 at the user's ear and a microphone 30 proximate the user's mouth.

FIG. 3 shows the housing 12 in a second open position. More specifically, the connection 26 allows the second section 24 of the housing to be folded over about another 180 degrees relative to the first section 22 of the housing as indicated by arrow 34. In this fully open 360 degree flipped position, the first and second sections 22, 24 are collapsed against each other in the open folded position shown, but in a reverse orientation relative to the closed, folded position shown in FIG. 1. In this second open position, the keypad 14 is located at the exterior facing side of the first section 22 and the display 16 is located at the opposite exterior facing side of the second section 24. In the folded fully open position shown in FIG. 3 a user can use the electronic device 10 in a collapsed, folded configuration, for example such as when the electronic device comprises a digital camera feature, or a game feature which could comprise use of keys on the second section 24, or when the display 16 comprises a touch screen display.

Referring also to FIG. 4, an exploded perspective view of the electronic device 10 is shown. The connection 26 generally comprises a synchronized rotation, multi-axis hinge 27 and an electrical flex conductor 48. The hinge 27 generally comprises a hinge frame 36, two hinge modules or pins 38, synchronizing gears 40, two frame members 42, 44, and a dust cover 46. The hinge frame 36 has a general oval side profile. The hinge frame 36 comprises two parallel pin receiving areas 50. The hinge frame 36 also comprises a recess 52 at the entrance to the pin receiving areas 50.

The hinge modules 38 are rotatably located in the receiving areas 50. Front portions 54 have a keyed shape to be received in key shaped apertures 56 of the gears 40. The gears 40 are interlockingly connected to each other by their teeth and grooves. With the gears 40 mounted on the front portions 54 of the hinge modules 38, the gears 40 are fixedly attached to the hinge modules 38 for synchronized rotation of the hinge modules 38 relative to each other. The gears 40 are located in the recess 52 of the hinge frame 36. The gears 40 form synchronization members to assist in synchronizing movement of the hinge frame 36 relative to movement of the first and second sections 22, 24 relative to each other. The hinge modules could be commercially available products. The hinge modules could comprise an internal detent system.

The front portions 54 of the hinge modules 38 are also connected to ends 58 the frame members 42, 44. Specifically, a first one of the hinge modules 38 is fixedly and stationarily connected to the front portion 54 of the first frame member 42 and, a second one of the hinge modules 38 is fixedly and stationarily connected to the front portion 54 of the second frame member 44. The dust cover 46 is preferably located between the gears 40 and the frame members 42, 44. The dust cover 46 helps to prevent dust or debris from entering into the receiving areas 50 of the hinge frame 36 and interfered with the interlocking engagement of the teeth and grooves of the gears 40. In the embodiment shown, opposite ends 60 of the frame members 42, 44 are pivotably connected to pivot sections 66 (see FIGS. 10 and 11) extending from the hinge frame 36.

The first frame member 42 is fixedly and stationarily attached to the first section 22 of the housing. The second frame member 44 is fixedly and stationarily attached to the second section 24 of the housing. FIG. 5 shows the hinge 27 at a first position corresponding to the closed position of the electronic device shown in FIG. 1. The dust cover 46 is not shown in FIGS. 5–7 for the sake of clarity. As can be seen, the second frame member 44 is located adjacent the front side of the first frame member 42.

When the second section 24 of the housing is moved from the closed position shown in FIG. 1 to the intermediate flipped open position shown in FIG. 2 the two frame members 42, 44 are repositioned relative to each other as shown in FIG. 6. Because the hinge modules 38 are stationarily connected to respective ones of the frame members 42, 44 and the gears 40 are stationarily connected to the hinge modules 38, the hinge frame 36 rotates about 90 degrees from the position shown in FIG. 5 to the positions shown in FIG. 6. The hinge modules 38 also rotating about 90 degrees relative to each other, but the two frame members 42, 44 rotate about 180 degrees relative to each other.

Because the hinge frame 36 comprises a general oval shaped side profile, the hinge frame 36 is able to span the gap between the connection areas with the frame members 42, 44 when the first and second sections 22, 24 are configured in their folded, thicker configuration shown in FIGS. 1 and 3. However, the hinge frame 36 is able to vertical align with the first and second sections 22, 24 when they are reconfigured into the smaller thickness intermediate flipped open position shown in FIG. 2. This provides the electronic device with a slimmer thickness profile at the hinge 27 when the device in at the intermediate flipped open position. This helps to match the thickness of the repositioned hinge frame with the thicknesses of the housing sections 22, 24; or at least not significantly stand out. This provides for a better appearance of the device when flipped open to the intermediate flipped open position. Alternatively, the hinge frame 36 can provide a relatively innocuous hinge transition between the first and second sections 22, 24 if the intermediate flipped open position is less than 180 degrees.

When the second section 24 of the housing is moved from the intermediate flipped open position shown in FIG. 2 to the 360 degree fully flipped open and folded position shown in FIG. 3, the two frame members 42, 44 are reposition relative to each other as shown in FIG. 7. The second frame member 44 is located against the rear side of the first frame member 42. Because the hinge modules 38 are stationarily connected to respective ones of the frame members 42, 44 and the gears 40 are stationarily connected to the hinge modules 38, the hinge frame 36 rotates another 90 degrees from the position shown in FIG. 6 to the position shown in FIG. 7. The hinge modules 38 also rotating another 90 degrees relative to each other, but the two frame members 42, 44 rotate about 180 degrees relative to each other. The two frame members 42, 44 are rotated about 360 degrees from the position shown in FIG. 5 to the position shown in FIG. 7. Thus, the electronic device 10 can be reconfigured from the folded closed position shown in FIG. 1 to the 360 degree fully flipped open and folded position shown in FIG. 3.

Referring back to FIG. 4, as noted above the connection 26 comprises a flex conductor 48, such as a flexible printed circuit. The flex conductor 48 connects electronic circuitry in the first section 22 with electronic circuitry in the second section 24. The flex conductor 48 extends across the hinge connection. In one embodiment, the hinge frame 36 could comprise a receiving area for receiving a portion of the flex conductor 48. In an alternate embodiment, the flex conductor 48 could be mounted on an exterior side of the hinge frame 36.

The present invention provides for a totally new concept for a different type of a flip phone. A mobile telephone incorporating features of the present invention can comprise a 360 degree turn of one housing section relative to another housing section. The present invention can provide a 360 degree hinge and, more specifically, a new synchronizing mechanism which can be integrated into the hinge of the foldable device. With the present invention, the synchronizing mechanism can be integrated into the hinge of the full folding device. One housing section of the device can be turned 360 degrees around another housing section of the device smoothly and synchronized with movement of the hinge frame.

The hinge synchronization mechanism can consist of a hinge frame, two synchronizing gears, two hinge modules or pins, and a dust shield. When turning the hinge from a closed start position, the synchronizing gears are connected to each other and both hinge axes are rotating similar angles. Both axes are rotated equally about 180 degrees. The present invention provides a controlled and synchronized 360 degree hinged movement. With the present invention, the usability of the product is approved. The present invention provides a robust and compact construction, and dust and particles are prevented entry to the mechanism.

Figure 8:
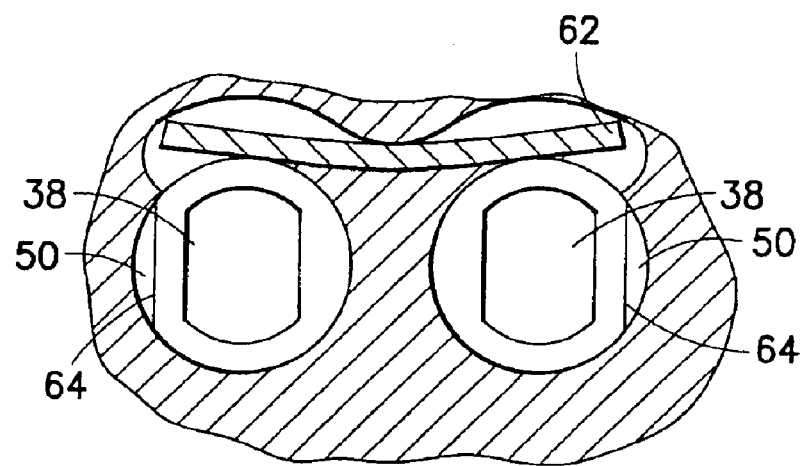
FIG. 8 is a partial cross sectional view of a detent system of an alternate embodiment of the hinge with the detent system shown in a position corresponding to the positions shown in FIGS. 1 and 5.
Figure 9:
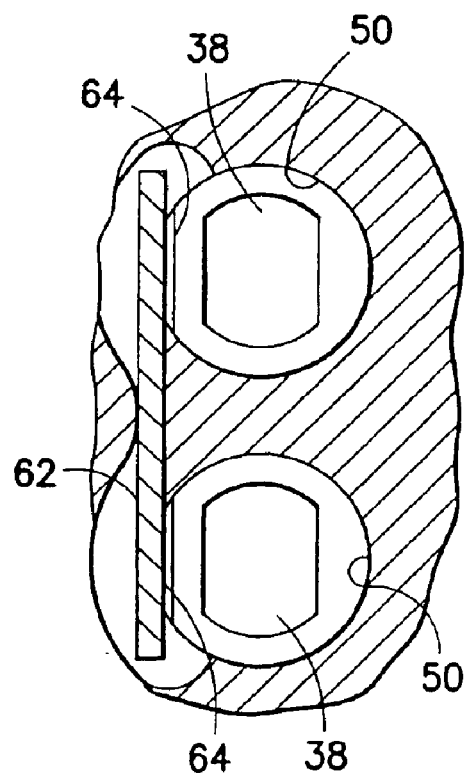
FIG. 9 is a partial cross sectional view of the detent system as in FIG. 8 shown in a position corresponding to the positions shown in FIGS. 2 and 6.

In order to maintain relative position of the first and second sections 22, 24 relative to each other, the hinge 27 could comprise sufficient frictional resistance to movement as is known in the art, such as a friction pack. Referring also to FIGS. 8 and 9, an alternate embodiment of a system for detent locating of the first and second sections relative to each other is shown. In this embodiment, the hinge comprises a leaf spring 62. The hinge modules 38 include exterior flat surfaces 64. FIG. 8 shows the interaction between the spring 62 and the exterior surfaces of the hinge on modules 38. In this position, the detent spring 62 is deflected by contact with the exterior surfaces of the hinge modules 38.

The position shown in FIG. 8 corresponds to the configuration of the electronic device as shown in FIG. 1. The flat surfaces 64 are spaced from the spring 62. When the electronic device is reconfigured to the position shown in FIG. 2, as shown in FIG. 9 the flat surfaces 64 comes into registration with the detent spring 62. The detent spring 62 returns to an undeflected position to form a biasing detent to hold the first and second sections 22, 24 at the intermediate flipped open position shown in FIG. 2. In alternate embodiment, any suitable type of detent configuration positioning system could be provided. For example, in one type of alternate embodiment, the hinge modules 38 could comprise an internal detent system, such as when the hinge modules each comprise more than a single member.

Figure 10:
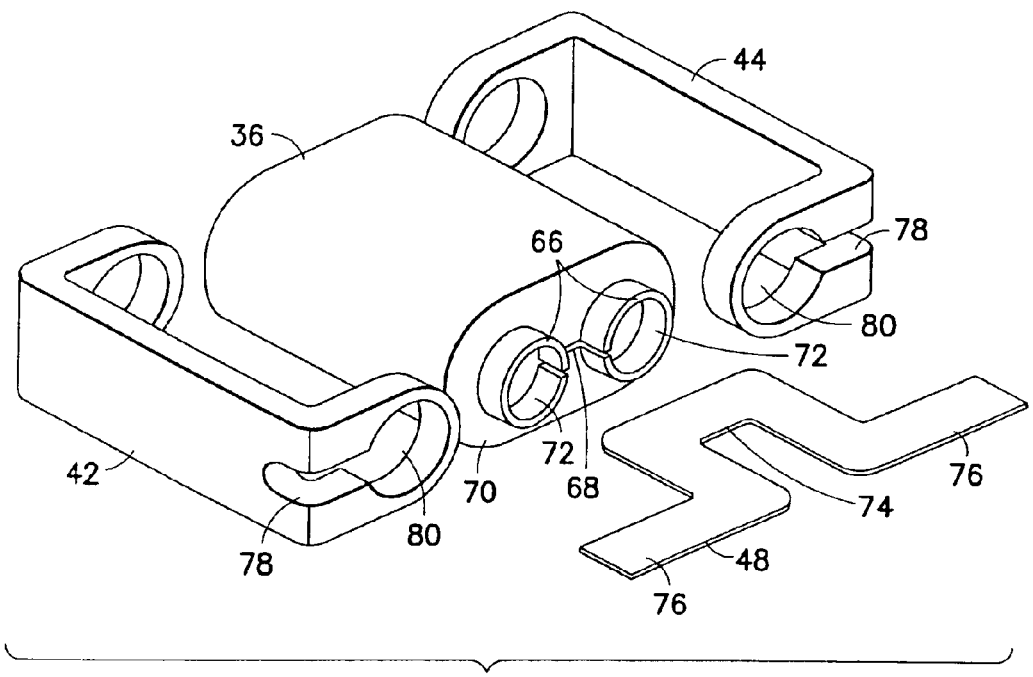
FIG. 10 is an exploded view of the hinge as shown in FIG. 5 from an opposite side.
Figure 11:
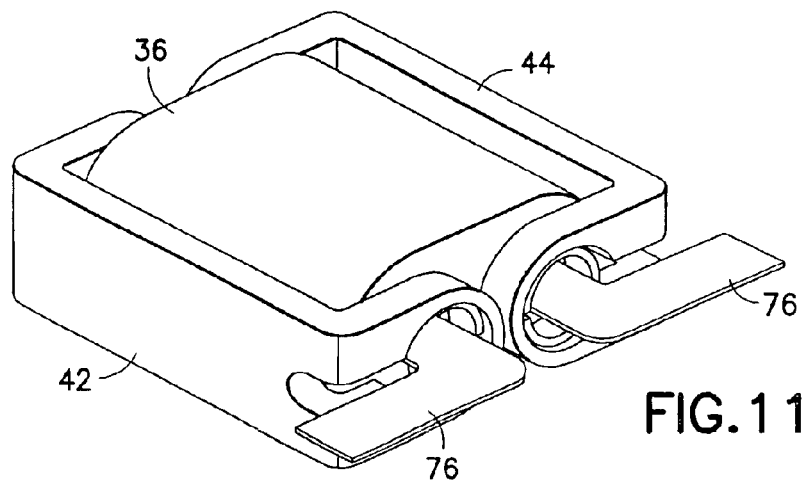
FIG. 11 is an assembled view of the hinge as shown in FIG. 10.

Referring now to FIGS. 10 and 11, a view of the hinge 27 of FIGS. 4–7 is shown from the opposite side. In this embodiment the flex conductor 48 is mounted to the interior side of the hinge frame. The hinge frame 36 has the two pivot sections 66 extending from the opposite side 70. Each pivot section 66 has a center channel 72. The hinge frame 36 includes a slot 68 into the side 70. The slot extends through the pivot sections 66 and connects the two center channels 72 to each other. The flex conductor 48 has a center portion 74 and two end portions 76. The center portion is inserted into the slot 68 and extends out of the two center channels 72. The end portions 76 extend in opposite directions once exiting the center channels 72. The two end portions 76 of the flex conductor are attached to circuitry in the first and second sections 22, 24. The flex conductor 48 is bendable as the first and second sections 22, 24 move relative to each other. The relatively long length of the flex conductor 48 helps to prevent metal fatigue of the conductors and failure of the flexible insulating substrate in the flex conductor 48.

The flex conductor 48 is inserted into the slot 68 before the frame members 42, 44 are attached to the pivot sections 66. In the embodiment shown, the frame members 42, 44 have slots 78 from the mounting apertures 80 which help to mount the frame members 42, 44 over the flex conductor 48 as shown in FIG. 11. Once assembled, the frame members 42, 44 block exit of the center portion 74 from the center of the slot 68 to thereby keep the assembly together. However, in alternate embodiments, any suitable type of assembly retainment system could be provided.

Frame members 42, 44 are very useful when assembling and for robust construction. However, in an alternate embodiment the frame members 42, 44 might not be provided. It is possible to mount the hinge frame and synchronizing mechanism directly to the housing sections 22, 24. Similar to a current type of mobile camera-phone, the present invention could comprise a camera at the junction between the two moving housing sections. More specifically, the present invention can be adapted to provide a camera in the hinge frame 36. A power plug and/or other external connector can alternatively or additionally be integrated into the hinge frame 36. In alternate embodiments, electrical connection through the hinge between the folds to the housing sections 22, 24 can be provided by any suitable electrical connection, such as done by a metal slide connection or by pin connectors. Both solutions can be based on the metal connection pads being on the two folds and a spring connector which touches the connection pads.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electronic device comprising:
   a first section having a keypad;
   a second section having a display; and
   a connection movably connecting the second section with the first section, the connection comprising a first axis of rotation with the first section, a second axis of rotation with the second section, and synchronizing members which rotate the first section relative to the connection in unison with rotation of the second section relative to the connection, wherein the second axis of rotation is offset from the first axis of rotation.

2. An electronic device as in claim 1 wherein the electronic device comprises a mobile communications device having a transceiver located in one of the first or second sections.

3. An electronic device as in claim 1 wherein the first and second sections comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the electronic device.

4. An electronic device as in claim 1 wherein the connection comprises a hinge frame having a general oval side profile and two parallel pin receiving holes.

5. An electronic device as in claim 1 further comprising a flex circuit extending across the connection and electrically connecting electronic circuitry in the first section to electronic circuitry in the second section.

6. An electronic device as in claim 4 wherein the hinge frame comprises a recess for receiving the synchronizing members.

7. An electronic device comprising:
   a first section;
   a second section having a display; and
   a connection movably connecting the second section with the first section, the connection comprising a first axis of rotation with the first section, an offset second axis of rotation with the second section, and synchronizing members which rotate the first section relative to the second section, wherein the synchronizing members comprises two gears connected to each other.

8. An electronic device as in claim 7 wherein the connection comprises two hinge pins rotatably mounted in the pin receiving holes, each hinge pin having one of the gears connected thereto, and each hinge pin being stationarily connected to a respective one of the first and second sections.

9. An electronic device comprising:
   a first section;
   a second section having a display; and
   a connection movably connecting the second section with the first section, the connection comprising a first axis of rotation with the first section, an offset second axis of rotation with the second section, and synchronizing members which rotate the first section relative to second section, wherein the connection comprises a detent locating system for locking position of the second section relative to the first section at an intermediate position between a fully closed position and a fully open position.

10. An electronic device as in claim 9 wherein the fully open position comprises about a 360 degree fully open position.

11. An electronic device as in claim 9 wherein the synchronizing members are adapted to rotate the first section relative to the connection in unison with rotation of the second section relative to the connection.

12. A mobile communications device comprising:
    a housing;
    a transceiver in the housing;
    a keypad connected to the housing; and
    a display connected to the housing;
    wherein the housing comprises a first section movably connected to a second section of the housing by a multi-axis hinge, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees.

13. A mobile communications device as in claim 12 wherein the first and second sections comprise a first position with the keypad and display being closed by the first and second sections, a second position with the second section rotated about 180 degrees relative to the first section such that the first section is substantially inline with the second section and a hinge frame of the hinge, and a third position with the second section rotated about 360 degrees relative to the first section and having the keypad and display located on opposite exterior facing sides of the mobile communications device.

14. A mobile communications device as in claim 12 wherein the hinge comprises a hinge frame having a general oval side profile and two parallel pin receiving holes.

15. A mobile communications device as in claim 12 further comprising a flex circuit extending across the hinge and electrically connecting electronic circuitry in the first section to electronic circuitry in the second section.

16. A mobile communications device as in claim 12 wherein the connection comprises a detent locating system for locking position of the second section relative to the first section at an intermediate position between a fully closed position and a 360 degree fully open position.

17. A mobile communications device as in claim 14 wherein the means for synchronizing rotation of the first and second sections relative to the hinge comprises gears connected to each other.

18. An electronic device as in claim 17 wherein the hinge comprises two hinge pins rotatably mounted in the pin receiving holes, each hinge pin having one of the gears connected thereto, and each hinge pin being stationarily connected to a respective one of the first and second sections.

19. A mobile communications device comprising:
    a housing having a first section, a second section, and a synchronized rotation multi-axis hinge connection connecting the first section with the second section;
    a transceiver located in the housing;
    a key pad connected to the housing;
    a display connected to the housing; and a flex conductor extending across the hinge connection and coupling electronic circuitry in the first section of the housing with electronic circuitry in the second section of the housing, wherein the synchronized rotation multi-axis hinge connection comprises:

a hinge frame;

two hinge pins rotatably mounted in the hinge frame;

synchronizing gears connecting the hinge pins to each other;

a first frame member fixedly connecting a first one of the hinge pins to the first section of the housing;

a second frame member fixedly connecting a second one of the hinge pins to the second section of the housing, and wherein the second section of the housing is adapted to rotate about 360 degrees relative to the first section of the housing.

20. A mobile communications device as in claim 19 wherein the connection comprises a detent locating system for locking position of the second section relative to the first section at an intermediate position at about 180 degrees of rotation between a fully closed position and a 360 degree fully open position.

21. A mobile communications device as in claim 19 wherein the first and second sections comprise a first position with the keypad and display being closed by the first and second sections, a second position with the second section rotated about 180 degrees relative to the first section, and a third position with the second section rotated about 360 degrees relative to the first section and having the keypad and display located on opposite exterior facing sides of the mobile communications device.

22. A mobile communications device as in claim 19 wherein the hinge frame has a general oval side profile and two parallel pin receiving holes.

23. An electronic device comprising:

a first section;

a second section having a display; and a connection movably connecting the second section with the first section, the connection comprising a first axis of rotation with the first section, a spaced second axis of rotation with the second section, and synchronizing members which rotate the first section relative to the connection in unison with rotation of the second section relative to the connection.

24. A mobile communications device comprising:

a housing;

a transceiver in the housing;

at least one key connected to the housing; and a display connected to the housing; wherein the housing comprises a first section movably connected to a second section of the housing by a multi-axis hinge, wherein a first axis of rotation of the hinge is provided for the first section of the housing and a second offset axis of rotation of the hinge is provided for the second section of the housing, and wherein the multi-axis hinge comprises a synchronizing system for synchronizing rotation of the first and second sections relative to the multi-axis hinge through a path of at least about 180 degrees.

* * * * *